US010787471B2

(12) United States Patent
Ivanov et al.

(10) Patent No.: US 10,787,471 B2
(45) Date of Patent: Sep. 29, 2020

(54) 1,3-DIPOLAR COMPOUND BEARING A PHOSPHORUS-CONTAINING GROUP AND A DIPOLE CONTAINING A NITROGEN ATOM

(71) Applicant: COMPAGNIE GENERALE DES ETABLISSEMENTS MICHELIN, Clermont-Ferrand (FR)

(72) Inventors: Sergey Ivanov, Clermont-Ferrand (FR); Claire Rannoux, Morges (CH); Anne-Lise Thuilliez, Clermont-Ferrand (FR); Anne-Frédérique Salit, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 135 days.

(21) Appl. No.: 15/741,914

(22) PCT Filed: Jul. 6, 2016

(86) PCT No.: PCT/EP2016/066018
§ 371 (c)(1),
(2) Date: Jan. 4, 2018

(87) PCT Pub. No.: WO2017/009150
PCT Pub. Date: Jan. 19, 2017

(65) Prior Publication Data
US 2018/0194787 A1    Jul. 12, 2018

(30) Foreign Application Priority Data
Jul. 10, 2015  (FR) .................................... 15 56565

(51) Int. Cl.
| *C08L 9/06* | (2006.01) |
| *C07F 9/12* | (2006.01) |
| *B60C 1/00* | (2006.01) |
| *C08C 19/24* | (2006.01) |
| *C08F 8/40* | (2006.01) |
| *C08F 36/14* | (2006.01) |
| *C08F 236/14* | (2006.01) |
| *C08J 3/20* | (2006.01) |
| *C08J 3/24* | (2006.01) |
| *C08K 3/36* | (2006.01) |
| *C08K 5/523* | (2006.01) |
| *C08K 5/54* | (2006.01) |

(52) U.S. Cl.
CPC .............. *C07F 9/12* (2013.01); *B60C 1/0016* (2013.01); *C08C 19/24* (2013.01); *C08F 8/40* (2013.01); *C08F 36/14* (2013.01); *C08F 236/14* (2013.01); *C08J 3/203* (2013.01); *C08J 3/24* (2013.01); *C08K 3/36* (2013.01); *C08K 5/523* (2013.01); *C08K 5/54* (2013.01); *C08L 9/06* (2013.01); *C08J 2309/06* (2013.01)

(58) Field of Classification Search
CPC . C07F 9/12; C08C 19/24; C08C 19/06; C08C 19/22; C08F 8/40; C08F 36/14; C08F 236/14; C08K 3/36; C08K 5/523; C08K 5/54; C08L 9/06; C08J 3/24; C08J 3/203; C08J 2309/06
USPC ......................................................... 523/351
See application file for complete search history.

(56) References Cited

U.S. PATENT DOCUMENTS

| 9,394,434 B2* | 7/2016 | Araujo da Silva ... B60C 1/0016 |
| 10,202,471 B2* | 2/2019 | Ugolnikov ........... C07D 233/61 |
| 2005/0256088 A1 | 11/2005 | Ames et al. |
| 2013/0123418 A1 | 5/2013 | Araujo Da Silva et al. |
| 2016/0251456 A1 | 9/2016 | Ugolnikov et al. |
| 2019/0048102 A1* | 2/2019 | Jean-Baptiste-Dit-Dominique ........... B60C 1/0016 |

FOREIGN PATENT DOCUMENTS

| WO | 2005110401 A1 | 11/2005 |
| WO | 2012007442 A1 | 1/2012 |
| WO | 2015059269 A1 | 4/2015 |
| WO | 2015121228 A1 | 8/2015 |

OTHER PUBLICATIONS

International Search Report for PCT/EP2016/066018 dated Oct. 5, 2016.
Nicolas Beziere et al: "Metabolic stability of superoxide adducts derived from newly developed cyclic nitrone spin traps", Free Radical Biology and Medicine, vol. 67, Feb. 1, 2014 (Feb. 1, 2014), pp. 150-158, XP055270905, US ISSN: 0891-5849, DOI: 10.1016/j.freeradbiomed.2013.10.812 Scheme 1; p. 151; compounds DEPMP0, DIPPMP0.
E. Boyland et al: "Arylhydroxylamines. III. Reactions with aldehydes", Journal of the Chemical Society, Jan. 1, 1963 (Jan. 1, 1963), pp. 3141-3144, XP055270945, Letchworth; GB ISSN: 0368-1769, DOI: 10.1039/ir9630003137 p. 3142.
C0urme C et al: "Terminal alkyne-functionalized triazine by Sonogashira coupling: synthesis of a potential cell signalling inhibitor via click chemistry", Tetrahedron Letters, PergamOn, GB, vol. 49, No. 29-30, Jul. 21, 2008 (Jul. 21, 2008), pp. 4542-4545, XP022713199, ISSN: 0040-4039, DOI: 10.1016/J.TETLET.2008.05.050 [retrieved on Mar. 14, 2008] compound 17.

(Continued)

*Primary Examiner* — Hannah J Pak
(74) *Attorney, Agent, or Firm* — Dickinson Wright PLLC

(57) ABSTRACT

A 1,3-dipolar compound bearing at least a phosphorus-containing group and a dipole containing a nitrogen atom is provided. A method for grafting the 1,3-dipolar compound on an unsaturated polymer, a diene polymer comprising, along the polymer chain, at least one pendant phosphorus-containing group, and a rubber composition based on a diene elastomer and the 1,3-dipolar compound optionally pre-grafted on the diene elastomer are also provided. The 1,3-dipolar compound allows access to rubber compositions reinforced with an inorganic filler that have a compromise of improved properties, namely hysteresis, stiffness in the cured state and reinforcement.

21 Claims, No Drawings

(56) References Cited

OTHER PUBLICATIONS

Zi Qiang Gu et al: "Synthesis and evaluation of imida2o[1,5-a][1,4]ben2odiazepine esters with high affinities and selectivities at "diazepam-insensitive" benzodiazepine receptors", Journal of Medicinal Chemistry, vol. 36, No. 8, Apr. 1, 1993 (Apr. 1, 1993), pp. 1001-1006, XP055270953, US ISSN: 0022-2623, DOI: 10.1021/im00060a007 scheme IV, intermedial re après étape d).
Der0uet D et al: "Flame-Resistance and Thermal Stability of 1,4-Polydienes Modified by Dialkyl(0r Aryl) Phosphates", Rapra Abstracts, Rapra Technology Ltd., Shrewsbury, GB, vol. 33, No. 12, Dec. 1, 1996 (Dec. 1, 1996), p. 83, XP000643586, ISSN: 0033-6750 the whole document.
Niels Aker0yd et al: "The combination of living radical polymerization and click chemistry for the synthesis of advanced macromolecular architectures", European Polymer Journal, Pergam0n Press Ltd. Oxford, GB, vol. 47, No. 5, Feb. 5, 2011 (Feb. 5, 2011), pp. 1207-1231, XP028209519, ISSN: 0014-3057, D0I: 10.1015/J.EURPOLYMJ.2011.02.003 [retrieved on Dec. 2, 2011] p. 1217-p. 1218.

\* cited by examiner

1,3-DIPOLAR COMPOUND BEARING A PHOSPHORUS-CONTAINING GROUP AND A DIPOLE CONTAINING A NITROGEN ATOM

This application is a 371 national phase entry of PCT/EP2016/066018, filed 6 Jul. 2016, which claims benefit of French Patent Application No. 1556565, filed 10 Jul. 2015, the entire contents of which are incorporated herein by reference for all purposes.

BACKGROUND

1. Technical Field

The field of the present invention is that of modifiers intended for functionalizing unsaturated polymers along the polymer chain.

2. Related Art

Modification of the chemical structure of a polymer generally has an effect on the chemical and physical properties of the polymer, as well as on the properties of compositions containing it. Structural modification of a polymer, such as functionalization of a polymer, is particularly necessary when we wish to have a polymer and a filler present together in a composition. Chemical modification of a polymer may improve the dispersion of the filler in the polymer and thus allow a more homogeneous material to be obtained. With certain fillers, such as carbon black or silica, better dispersion of the filler will generally be reflected in a lowering of hysteresis of the composition. Such a property is required notably in rubber compositions intended for example for applications for tires. This lowering of hysteresis is often accompanied by a decrease in stiffness of the composition in the cured state, which may make the composition unsuitable for the intended use. There is therefore a need to find modifiers that make it possible both to functionalize a polymer and to modify this compromise between hysteresis and stiffness in the cured state of a composition comprising a polymer and a filler.

The chemical reactions for modifying an unsaturated polymer include the reactions of grafting of a compound. Compounds that are known to graft onto an unsaturated polymer are for example 1,3-dipolar compounds as described in patent applications WO 2006/045088 and WO 2012/007441. The first application describes compounds that allow grafting of an oxazoline, thiazoline, alkoxysilane or allyltin function. The second describes compounds that allow grafting of nitrogen-containing associative functions. However, neither of these applications describes 1,3-dipolar compounds bearing a phosphate group, or grafting of a phosphate function on an unsaturated polymer by reaction of these 1,3-dipolar compounds with the aim of modifying the compromise between hysteresis and stiffness in the cured state and reinforcement of a composition comprising the polymer in the presence of a filler.

SUMMARY

Thus, the invention relates firstly to a 1,3-dipolar compound comprising a phosphorus-containing group of formula (I) and a dipole containing a nitrogen atom,

—OP(O)(OR')(OR")     (I)

where R' and R", which may be identical or different, represent a hydrogen or a carbon-containing group.

The invention also relates to a method for modifying an unsaturated polymer by a grafting reaction, said method comprising reaction of the 1,3-dipolar compound according to the invention on at least one and preferably several unsaturations of the unsaturated polymer.

The invention also relates to a diene polymer comprising, along the polymer chain, one or more pendant phosphorus-containing groups of formula (I), in which at least one of R' and R" is different from H.

The invention also relates to a diene polymer whose essential feature is that it comprises one or more pendant phosphorus-containing groups of formula (I), as well as one or more pendant isoxazoline rings.

The invention also relates to a rubber composition based on at least a diene elastomer, a reinforcing filler comprising an inorganic reinforcing filler and the 1,3-dipolar compound, as well as to the method for preparing the composition, and to a tire that comprises the rubber composition, notably in its tread.

DETAILED DESCRIPTION OF EXAMPLE EMBODIMENTS

In the present description, unless expressly stated otherwise, all percentages (%) indicated are percentages by weight. The abbreviation "phr" signifies parts by weight per hundred parts of elastomer (of the total elastomers if several elastomers are present).

Moreover, any range of values denoted by the expression "between a and b" represents the range of values greater than "a" and less than "b" (i.e. excluding the limits a and b) whereas any range of values denoted by the expression "from a to b" signifies the range of values from "a" to "b" (i.e. including the strict limits a and b).

The expression "composition based on" means, in the present description, a composition comprising the mixture and/or the reaction product in situ of the various constituents used, certain of these basic constituents (for example the elastomer, the filler or some other additive used conventionally in a rubber composition intended for tire manufacture) being able to, or intended to react with one another, at least partly, during the various steps of manufacture of the composition intended for tire manufacture.

The term 1,3-dipolar compound is to be understood according to the definition given by IUPAC.

The essential feature of the 1,3-dipolar compound is that it comprises a dipole containing a nitrogen atom and a phosphorus-containing group of formula (I) in which R' and R", which may be identical or different, represent a hydrogen or a carbon-containing group,

—OP(O)(OR')(OR")     (I)

Carbon-containing group means a radical that contains carbon, such as a hydrocarbon group or a group containing carbon, hydrogen and at least one heteroatom.

According to one embodiment of the invention, the carbon-containing group is selected from the group of the alkyls, the aryls and the alkaryl groups.

According to one embodiment of the invention, at least one of R' and R" is different from H.

According to a particular embodiment of the invention, R' and R" represent independently an alkyl group, preferably C1-C12, more preferably C1-C6. A Cn group means a group that contains n carbon atoms, n being an integer. Cn-Cm means a group that contains from n to m carbon atoms, m being an integer.

Preferably, R' and R", which may be identical or different, are methyl or ethyl.

According to any one of the embodiments of the invention, the 1,3-dipolar compound preferably comprises a single phosphoric acid ester group or a single dipole containing a nitrogen atom, more preferably a single phosphoric acid ester group and a single dipole containing a nitrogen atom.

According to one embodiment of the invention, the dipole containing a nitrogen atom is selected from the group consisting of the dipole —C≡N→O, the dipole C=N→N—, and the dipole —C≡N(→O)—. According to this embodiment, the 1,3-dipolar compound is selected from the group consisting of the nitrile oxides, the nitrones and the nitrile mines.

According to a preferred embodiment of the invention, the dipole is the dipole —C≡N→O, in which case the 1,3-dipolar compound is a nitrile oxide.

According to one embodiment of the invention, the 1,3-dipolar compound comprises the unit of formula (II)

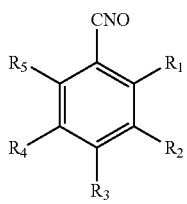

(II)

in which four of the five symbols $R_1$ to $R_5$, which may be identical or different, are each an atom or a group of atoms, preferably an aliphatic group or an aromatic group and the fifth symbol denotes a direct or indirect attachment to the phosphorus-containing group, knowing that $R_1$ and $R_5$ are both different from H.

According to a preferred embodiment of the invention, $R_2$ to $R_4$ represents a direct attachment to the phosphorus-containing group.

According to another preferred embodiment of the invention, $R_1$, $R_3$ and $R_5$ are identical.

According to another preferred embodiment of the invention, $R_1$, $R_3$ and $R_5$ are each a C1-C6, preferably C1-C3 alkyl group. More preferably, $R_1$, $R_3$, and $R_5$ are each a methyl or an ethyl.

Advantageously, the 1,3-dipolar compound is of formula (III).

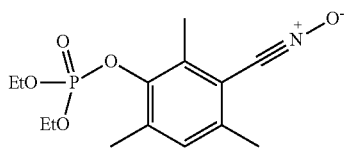

(III)

The method according to embodiments of the invention, which makes it possible to modify an unsaturated polymer, polymer A, by a grafting reaction, has the essential feature of comprising the reaction of the 1,3-dipolar compound on at least one unsaturation of polymer A. The 1,3-dipolar compound is the 1,3-dipolar compound of the invention, according to any one of the embodiments of the invention.

According to any one embodiment of the invention, the 1,3-dipolar compound preferably reacts on several unsaturations of polymer A, in which case the method according to embodiments of the invention allows the synthesis of a polymer, polymer B, comprising several phosphorus-containing groups along the polymer chain. "Several unsaturations" means at least 2 unsaturations.

The reaction of the 1,3-dipolar compound on polymer A is a reaction of [3+2] cycloaddition.

According to any one of the embodiments of the invention, the unsaturations of polymer A are preferably carbon-carbon double bonds.

The reaction of the 1,3-dipolar compound on polymer A may be carried out in the bulk, for example in an internal mixer or an external mixer such as an open mill. The mixture comprising the 1,3-dipolar compound and polymer A is for example brought to a temperature of the external mixer or internal mixer below 60° C., then submitted in a press or in a stove to temperatures ranging from 80° C. to 200° C. Alternatively the mixture is brought to a temperature of the external mixer or internal mixer above 60° C. without subsequent thermal treatment.

The addition reaction of the 1,3-dipolar compound on polymer A may also be carried out in solution. The temperature at which the reaction is carried out is easily adjusted by a person skilled in the art based on his general knowledge, taking into account the concentration of the reaction mixture, the reflux temperature of the solvent, and the thermal stability of polymer A and of the 1,3-dipolar compound. For example, a temperature around 60° C. may be suitable. The polymer thus modified, polymer B, may be separated from its solution by any type of means known by a person skilled in the art and in particular by an operation of solvent evaporation under reduced pressure or by a steam stripping operation.

In the addition reaction of the 1,3-dipolar compound on polymer A, the 1,3-dipolar compound is reacted according to a preferred stoichiometry between 0 and 5 molar equivalents, more preferably between 0 and 2 molar equivalents, even more preferably between 0 and 1 molar equivalent, of phosphorus-containing group per 100 moles of monomer units constituting polymer A. For each of these preferred ranges, the lower bound is advantageously at least 0.1 molar equivalent of 1,3-dipolar compound. The amount of 1,3-dipolar compound used is expressed in molar equivalent of phosphorus-containing group. For example, if the 1,3-dipolar compound contains a single phosphorus-containing group, one mole of phosphorus-containing group corresponds to one mole of 1,3-dipolar compound. If the 1,3-dipolar compound contains two phosphorus-containing groups, two moles of phosphorus-containing group correspond to one mole of 1,3-dipolar compound. In the latter case the use of the 1,3-dipolar compound according to one molar equivalent of phosphorus-containing group corresponds to one half-mole of 1,3-dipolar compound. These preferred ranges can apply to any one of the embodiments of the invention.

Preferably, whether the reaction of the 1,3-dipolar compound on polymer A is carried out in solution or in the bulk, polymer A is antioxidized beforehand to prevent possible degradation of the macrostructure of the polymer during the reaction.

Before undergoing the reaction of addition of the 1,3-dipolar compound, polymer A has at least one and preferably several unsaturations that are able to react with the 1,3-dipolar compound according to embodiments of the invention.

Polymer A is preferably a diene polymer, more preferably a diene elastomer. When polymer A is a diene polymer or a diene elastomer, a person skilled in the art will understand that the unsaturations on which the 1,3-dipolar compound reacts are carbon-carbon double bonds.

Diene polymer means a polymer comprising diene monomer units, in particular 1,3-diene monomer units.

"Diene" elastomer (or indistinguishably rubber) is to be understood in a known manner as an elastomer consisting at least partly (i.e. a homopolymer or a copolymer) of diene monomer units (monomers bearing two carbon-carbon double bonds, conjugated or unconjugated).

These diene elastomers may be classified in two categories: "essentially unsaturated" or "essentially saturated". "Essentially unsaturated" is generally understood as a diene elastomer derived at least partly from conjugated diene monomers, having a level of units of diene origin (conjugated dienes) that is greater than 15% (mol %); thus, diene elastomers such as butyl rubbers or copolymers of dienes and alpha-olefins of the EPDM type are not included in the above definition and may notably be described as "essentially saturated" diene elastomers (low or very low level of units of diene origin, always below 15%). Within the category of the "essentially unsaturated" diene elastomers, "highly unsaturated" diene elastomer means in particular a diene elastomer having a level of units of diene origin (conjugated dienes) that is above 50%.

Based on these definitions, diene elastomer usable in the compositions according to embodiments of the invention means more particularly:
(a)—any homopolymer of a conjugated diene monomer, notably any homopolymer obtained by polymerization of a conjugated diene monomer having from 4 to 12 carbon atoms;
(b)—any copolymer obtained by copolymerization of one or more conjugated dienes with one another or with one or more aromatic vinyl compounds having from 8 to 20 carbon atoms;
(c)—a ternary copolymer obtained by copolymerization of ethylene, of an α-olefin having 3 to 6 carbon atoms with an unconjugated diene monomer having from 6 to 12 carbon atoms, for example the elastomers obtained from ethylene and from propylene with an unconjugated diene monomer of the aforementioned type such as notably hexadiene-1,4, ethylidene norbornene, dicyclopentadiene;
(d)—a copolymer of isobutene and isoprene (butyl rubber), as well as the halogenated versions, in particular chlorinated or brominated, of this type of copolymer.

Although it applies to any type of diene elastomer, a skilled person in the field of tires will understand that embodiments of the present invention is preferably carried out with essentially unsaturated diene elastomers, in particular of type (a) or (b) above.

In the case of copolymers of type (b), they contain from 20 to 99 wt % of diene units and from 1 to 80 wt % of aromatic vinyl units.

As conjugated dienes, notably the following are suitable: butadiene-1,3,2-methyl-1,3-butadiene, the 2,3-di($C_1$-$C_5$ alkyl)-1,3-butadienes such as for example 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene, 2,4-hexadiene.

The following, for example, are suitable as aromatic vinyl compounds: styrene, ortho-, meta-, para-methylstyrene, "vinyl-toluene" commercial mixture, para-tert-butylstyrene, the methoxystyrenes, the chlorostyrenes, vinylmesitylene, divinylbenzene, vinylnaphthalene.

Preferably, the diene elastomer is an essentially unsaturated elastomer selected from the group consisting of the polybutadienes (BR), polyisoprenes, butadiene copolymers, isoprene copolymers, and mixtures of these elastomers. The following are suitable quite particularly as the diene elastomer: a polybutadiene (BR), a copolymer of butadiene and styrene (SBR), a natural rubber (NR) or a synthetic polyisoprene (IR) preferably having a molar level of cis-1,4 bond above 90%.

The embodiments of the invention also relates to a diene polymer, preferably elastomeric, that comprises one or more pendant phosphorus-containing groups of formula (I)

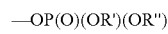

—OP(O)(OR′)(OR″)   (I)

in which R′ and R″ are defined as before with the condition that at least one of R′ and R″ is different from hydrogen.

The embodiments of the invention also relates to a diene polymer whose essential feature is that it comprises one or more pendant phosphorus-containing groups of formula (I), as well as one or more pendant isoxazoline rings, a structure that results from the [3+2] cycloaddition of the 1,3-dipolar compound on a carbon-carbon double bond of polymer A. R′ and R″ are defined according to any one of the embodiments of the 1,3-dipolar compound. The diene polymer according to embodiments of the invention may be polymer B obtained by the method described according to any one of its embodiments.

Polymer B is preferably a diene elastomer, called diene elastomer B, which implies that polymer B contains diene units and therefore comprises, by the definition of a diene elastomer, carbon-carbon double bonds.

The composition, also according to embodiments of the invention, is based on at least a diene elastomer, elastomer C, a reinforcing filler comprising an inorganic reinforcing filler and the 1,3-dipolar compound according to the invention.

According to any one of the embodiments of the invention, elastomer C is preferably an essentially unsaturated elastomer selected from the group consisting of the polybutadienes, the polyisoprenes, the butadiene copolymers, the isoprene copolymers and mixtures of these elastomers.

Reinforcing filler means particles whose average size (weight-average size) is less than a micrometer, generally under 500 nm, most often between 20 and 200 nm, in particular and more preferably between 20 and 150 nm.

"Inorganic reinforcing filler" is to be understood here as any inorganic or mineral filler, regardless of its colour and its origin (natural or synthetic), also called "white" filler, "clear" filler or even "non-black" filler, as opposed to carbon black, capable of reinforcing on its own, with no other means than an intermediate coupling agent, a rubber composition intended for the manufacture of pneumatic tires, in other words able to replace, in its function of reinforcement, a conventional carbon black of tire grade; such a filler is generally characterized, in a known manner, by the presence of hydroxyl groups (—OH) on its surface.

Notably mineral fillers of the siliceous type, preferably silica ($SiO_2$), are suitable as inorganic reinforcing fillers. The silica used may be any reinforcing silica known by a person skilled in the art, notably any precipitated or pyrogenic silica having a BET surface area as well as a CTAB specific surface area both below 450 $m^2/g$, preferably from 30 to 400 $m^2/g$, notably between 60 and 300 $m^2/g$. As highly dispersible precipitated silicas (called "HDS"), we may mention for example the "Ultrasil" 7000 and "Ultrasil" 7005 silicas from the company Degussa, the "Zeosil" 1165MP, 1135MP and 1115MP silicas from the company Rhodia, the "Hi-Sil"

EZ150G silica from the company PPG, the "Zeopol" 8715, 8745 and 8755 silicas from the company Huber, and the high specific surface area silicas as described in application WO 03/016387.

In the present account, the BET specific surface area is determined in a known manner by gas adsorption by the Brunauer-Emmett-Teller method described in "*The Journal of the American Chemical Society*" Vol. 60, page 309, February 1938, more precisely according to French standard NF ISO 9277 of December 1996 (multipoint (5-point) volumetric method—gas: nitrogen; degassing: 1 hour at 160° C.; range of relative pressure p/po: 0.05 to 0.17). The CTAB specific surface area is the external surface area determined according to French standard NF T 45-007 of November 1987 (method B).

The physical state of the inorganic reinforcing filler does not matter, whether it is in the form of powder, microbeads, granules, or beads. Of course, inorganic reinforcing filler also means mixtures of different inorganic reinforcing fillers, in particular of highly dispersible silicas as described above.

A person skilled in the art will understand that as a filler equivalent to the inorganic reinforcing filler described in the present paragraph, it would be possible to use a reinforcing filler of some other nature, notably organic such as carbon black, provided that this reinforcing filler is coated with an inorganic layer such as silica, or else has functional sites, notably hydroxyls, on its surface, requiring the use of a coupling agent for establishing a bond between the filler and the elastomer. As an example, we may mention for example carbon blacks for tires as described for example in patent documents WO 96/37547, WO 99/28380.

According to any one of the embodiments of the invention, the inorganic reinforcing filler preferably represents more than 50 wt % of the weight of the reinforcing filler of the rubber composition. It is then said that the inorganic reinforcing filler is predominant.

When it is combined with a predominant inorganic reinforcing filler such as silica, carbon black is preferably used at a level below 20 phr, more preferably below 10 phr (for example between 0.5 and 20 phr, notably between 2 and 10 phr). In the stated ranges, we have the benefit of the colouring properties (black pigmenting agent) and anti-UV properties of the carbon blacks, but without any impairment of the typical performance provided by the inorganic reinforcing filler.

All carbon blacks are suitable as carbon blacks, notably the blacks conventionally used in tires or tire treads (called tire-grade blacks). Among the latter, we may mention more particularly the reinforcing carbon blacks of series 100, 200, 300, or the carbon blacks of series 500, 600 or 700 (ASTM grades), for example the N115, N134, N234, N326, N330, N339, N347, N375, N550, N683, N772 carbon blacks). These carbon blacks may be used in the isolated state, as available commercially, or in any other form, for example as a support of certain of the additives used in rubber manufacture.

The level of inorganic reinforcing filler is preferably between 30 and 160 phr, more preferably between 40 phr and 160 phr. Below 30 phr, the reinforcement of the rubber composition may be insufficient to supply an adequate level of cohesion or of wear resistance of the rubber component of the tire comprising this composition. Even more preferably, the level of inorganic reinforcing filler is at least 50 phr. Beyond 160 phr, there is a risk of increasing the hysteresis and therefore the rolling resistance of the tires. For this reason, the level of inorganic reinforcing filler is preferably in a range from 50 to 120 phr, notably for use in a tire tread.

Any one of these preferred ranges of the level of inorganic reinforcing filler applies to any one of the embodiments of the invention.

For coupling the inorganic reinforcing filler to elastomer C, as is well known, a coupling agent is used, notably a silane, (or bonding agent) at least bifunctional, intended to provide a sufficient connection, of a chemical and/or physical nature, between the inorganic filler (surface of its particles) and the diene elastomer. Organosilanes or polyorganosiloxanes, at least bifunctional, are used in particular.

Notably polysulphurized silanes are used, called "symmetric" or "asymmetric" depending on their particular structure, as described for example in applications WO03/002648 (or US 2005/016651) and WO03/002649 (or US 2005/016650).

Without the following definition being limiting, polysulphurized silanes are suitable in particular that correspond to general formula (V)

$$Z\text{-}A\text{-}S_x\text{-}A\text{-}Z \qquad (V)$$

in which:

x is an integer from 2 to 8 (preferably from 2 to 5);
the symbols A, which may be identical or different, represent a divalent hydrocarbon radical (preferably a $C_1$-$C_{18}$ alkylene group or a $C_6$-$C_{12}$ arylene group, more particularly a $C_1$-$C_{10}$, notably $C_1$-$C_4$ alkylene, in particular propylene);
the symbols Z, which may be identical or different, correspond to one of the three formulae below:

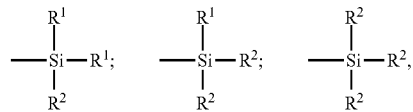

in which:
the radicals $R^1$, substituted or unsubstituted, and identical or different, represent a $C_1$-$C_{18}$ alkyl, $C_5$-$C_{18}$ cycloalkyl or $C_6$-$C_{18}$ aryl group (preferably $C_1$-$C_6$ alkyl groups, cyclohexyl or phenyl, notably $C_1$-$C_4$ alkyl groups, more particularly methyl and/or ethyl).
the radicals $R^2$, substituted or unsubstituted, and identical or different, represent a $C_1$-$C_{18}$ alkoxy or $C_5$-$C_{18}$ cycloalkoxyl group (preferably a group selected from $C_1$-$C_8$ alkoxyls and $C_5$-$C_8$ cycloalkoxyls, even more preferably a group selected from $C_1$-$C_4$ alkoxyls, in particular methoxy and ethoxy).

In the case of a mixture of polysulphurized alkoxysilanes corresponding to formula (I) above, notably the usual commercially available mixtures, the average value of "x" is a fractional number preferably between 2 and 5, more preferably close to 4. However, embodiments of the invention may also be carried out advantageously for example with disulphurized alkoxysilanes (x=2).

As examples of polysulphurized silanes, we may mention more particularly the polysulphides (notably disulphides, trisulphides or tetrasulphides) of bis(alkoxy($C_1$-$C_4$)-alkyl ($C_1$-$C_4$)silyl-alkyl($C_1$-$C_4$)), for example the polysulphides of bis(3-trimethoxysilylpropyl) or of bis(3-triethoxysilylpropyl). Among these compounds, bis(3-triethoxysilylpropyl) tetrasulphide, abbreviated to TESPT, of formula $[(C_2H_5O)_3Si(CH_2)_3S_2]_2$, or bis(triethoxysilylpropyl) disulphide, abbreviated to TESPD, of formula $[(C_2H_5O)_3Si(CH_2)_3S]_2$, is used in particular.

As a coupling agent other than polysulphurized alkoxysilane, we may notably mention bifunctional POSS (polyorganosiloxanes) or polysulphides of hydroxysilane as described in patent applications WO 02/30939 (or U.S. Pat. No. 6,774,255), WO 02/31041 (or US 2004/051210) or silanes or POSS bearing azo-dicarbonyl functional groups, as described for example in patent applications WO 2006/125532, WO 2006/125533, WO 2006/125534.

The content of the coupling agent is advantageously below 20 phr, it being understood that it is generally desirable to use as little of it as possible. Typically the level of coupling agent represents from 0.5 to 15 wt % relative to the amount of inorganic filler. Its level is preferably between 0.5 and 12 phr, more preferably in a range from 3 to 10 phr. This level is easily adjusted by a person skilled in the art according to the level of inorganic filler used in the composition.

In addition to the coupling agents, the rubber composition according to embodiments of the invention may also contain coupling activators, coating agents of the inorganic fillers or more generally processing aids which, in a known manner, owing to improvement of the dispersion of the filler in the rubber matrix and to lowering of the viscosity of the compositions, are able to improve their usability in the raw state.

The rubber composition according to embodiments of the invention may also comprise some or all of the usual additives commonly employed in the elastomer compositions intended to constitute external mixtures of finished rubber articles such as tires, in particular tire treads, for example plasticizers or extender oils, whether the latter are of an aromatic or non-aromatic nature, notably oils that are very slightly aromatic or non-aromatic (e.g. paraffinic oils, hydrogenated naphthenic oils, MES or TDAE oils), vegetable oils, in particular the glycerol esters such as the glycerol trioleates, hydrocarbon-containing plasticizing resins having a high Tg, preferably above 30° C., as described for example in applications WO 2005/087859, WO 2006/061064 and WO 2007/017060, pigments, protective agents such as anti-ozone waxes, chemical anti-ozone agents, antioxidants, antifatigue agents, reinforcing resins (such as resorcinol or bismaleimide), methylene acceptors (for example novolak phenolic resin) or methylene donors (for example HMT or H3M) as described for example in application WO 02/10269, a crosslinking system, vulcanization accelerators or retarders, vulcanization activators. The crosslinking system is preferably based on sulphur, but it may also be based on sulphur donors, peroxide, bismaleimides or mixtures thereof.

The amount of 1,3-dipolar compound in the rubber composition is between 0 and 5 molar equivalents, preferably between 0 and 2 molar equivalents, more preferably between 0 and 1 molar equivalent, of phosphorus-containing group per 100 moles of monomer units constituting elastomer C.

According to a particular embodiment of the invention, the 1,3-dipolar compound is pre-grafted on diene elastomer C, for example by the method of grafting according to embodiments of the invention, in which case diene elastomer C and the 1,3-dipolar compound together form one component in the rubber composition, in the present case a diene elastomer modified by a grafting reaction of the 1,3-dipolar compound.

The rubber composition according to embodiments of the invention is manufactured in suitable mixers, using two successive steps of preparation that are familiar to a person skilled in the art: a first step of thermomechanical working or kneading (the so-called "non-productive" step) at high temperature, up to a maximum temperature between 130° C. and 200° C., followed by a second step of mechanical working (the so-called "productive" step) up to a lower temperature, typically below 110° C., for example between 40° C. and 100° C., a finishing step during which the crosslinking system is incorporated.

The method for preparing the rubber composition according to embodiments of the invention that further comprises a crosslinking system comprises the following steps:
during a first so-called non-productive step, adding the 1,3-dipolar compound, the inorganic reinforcing filler, and if applicable the coupling agent, to the diene elastomer C, kneading thermomechanically until a maximum temperature between 130 and 200° C. is reached, the 1,3-dipolar compound optionally being pre-grafted on elastomer C,
cooling the mixture to a temperature below 100° C.,
then incorporating the crosslinking system,
kneading the whole up to a maximum temperature below 120° C.

When the 1,3-dipolar compound is pre-grafted on elastomer C, the 1,3-dipolar compound and the diene elastomer are contacted together before being brought into contact with the other constituents of the rubber composition. This preliminary contact allows the 1,3-dipolar compound to react on the carbon-carbon double bonds of elastomer C. The reaction product is a diene elastomer, some of the diene units of which have reacted with the 1,3-dipolar compound by [2+3] cycloaddition. Consequently, it is the reaction product that goes into the rubber composition and not elastomer C and the 1,3-dipolar compound.

Grafting may be carried out in solution, continuously or discontinuously. The diene elastomer thus modified may be separated from its solution by any type of means known by a person skilled in the art and in particular by a steam stripping operation.

Grafting of the 1,3-dipolar compound may also be carried out in the bulk, for example in an internal mixer or an external mixer such as an open mill. Grafting is then carried out either at a temperature of the external mixer or of the internal mixer below 60° C., followed by a step of a grafting reaction in a press or in a stove at temperatures ranging from 80° C. to 200° C., or at a temperature of the external mixer or of the internal mixer above 60° C. without subsequent thermal treatment. When grafting is carried out in the bulk, it is preferably carried out in the presence of an antioxidant, generally added at the end of synthesis of the diene elastomer C as is done conventionally.

Thus, a preferred embodiment of the method comprises the following steps:
during a first so-called non-productive step, adding the 1,3-dipolar compound to diene elastomer C, by kneading thermomechanically,
then adding the reinforcing filler, and if applicable a coupling agent, kneading thermomechanically until a maximum temperature between 130 and 200° C. is reached,
cooling the mixture to a temperature below 100° C.,
then incorporating the crosslinking system,
kneading the whole up to a maximum temperature below 120° C.

The contact time between diene elastomer C and the 1,3-dipolar compound, which are kneaded thermomechanically, is adjusted as a function of the conditions of thermomechanical kneading, notably as a function of the temperature. The higher the kneading temperature, the shorter this contact time. Typically it is from 1 to 5 minutes for a temperature from 100 to 130° C.

After all the ingredients of the rubber composition have been incorporated, the final composition thus obtained is then calendered, for example in the form of a sheet or a plate, notably for characterization in the laboratory, or is extruded, to form for example a rubber profiled element used as a rubber component for tire manufacture, notably a tire tread.

Thus, according to a particular embodiment of the invention, the rubber composition according to the invention, which may be either in the raw state (before crosslinking or vulcanization), or in the cured state (after crosslinking or vulcanization), is in a tire, notably in a tire tread.

The aforementioned features of the present invention, as well as others, will be better understood on reading the following description of several embodiment examples of the invention, given for purposes of illustration and non-limiting.

EMBODIMENT EXAMPLES OF THE INVENTION

1—Measurements and Tests Used:

Nmr Analysis:

Structural analysis as well as determination of the molar purities of the synthetic molecules are performed by NMR analysis. The spectra are acquired on an Avance 3 400 MHz BRUKER spectrometer equipped with a BBFO-zgrad 5 mm "broad band" probe. The quantitative $^1$H NMR experiment uses a simple 30° pulse sequence and a repetition delay of 3 seconds between each of the 64 acquisitions. The samples are dissolved in deuterated dimethylsulphoxide (DMSO), unless stated otherwise. This solvent is also used for the lock signal, unless stated otherwise.

When deuterated DMSO is used as solvent, calibration for NMR analysis is performed on the signal of the protons of the deuterated DMSO at 2.44 ppm and on the carbons of the deuterated DMSO at 39.5 ppm relative to a reference TMS at 0 ppm.

The $^1$H NMR spectrum coupled to the 2D HSQC $^1$H/13C and HMBC $^1$H/$^{13}$C experiments allows structural determination of the molecules (cf. tables of attributions). The molar quantifications are performed on the basis of the quantitative 1D $^1$H NMR spectrum.

Tensile Tests:

These tensile tests make it possible to determine the elastic stresses. Unless stated otherwise, they are carried out according to French standard NF T 46-002 of September 1988. Processing of these tensile test recordings also allows a curve to be plotted of the modulus as a function of the elongation. At a first elongation, the nominal secant moduli are measured, calculated with reference to the initial cross-section of the test specimen (or apparent stress, in MPa) at 100% and 300% elongation, designated MSA100 and MSA300 respectively.

All these tensile measurements are performed in normal temperature conditions (23±2° C.) according to standard NF T 46-002.

The moduli MSA100 and MSA300 are expressed based on 100 relative to the control composition. A value above 100 represents an increase of the modulus.

The reinforcement index, which is the ratio of the modulus MSA300 to the modulus MSA100, is expressed based on 100 relative to the control composition. A value above 100 represents an improvement of the reinforcement of the composition under consideration relative to the control composition.

Dynamic Properties:

The dynamic properties tan(δ)max are measured on a viscoanalyser (Metravib VA4000), according to standard ASTM D 5992-96. The response of a sample of vulcanized composition (cylindrical test specimen with thickness of 4 mm and cross-section of 400 mm$^2$), subjected to sinusoidal stressing in alternating simple shear, at a frequency of 10 Hz, in normal temperature conditions (23° C.), is recorded according to standard ASTM D 1349-99. A strain amplitude scan is performed from 0.1% to 100% (forward cycle), and then from 100% to 0.1% (return cycle). The results used are the difference in modulus (ΔG*) between the values at 0.1 and 100% strain (Payne effect), the complex dynamic shear modulus (G*) at 25% strain and the maximum value of tan δ observed for the return cycle, designated tan(6)max.

The values of ΔG* are expressed based on 100 relative to the control: a value below 100 represents a decrease of the difference in modulus, or an increase in linearization of the rubber composition.

The values of G* are expressed based on 100 relative to the control: a value above 100 represents an increase of the modulus, or an increase of the rigidity of the rubber composition The values of tan(δ)max are expressed based on 100 relative to the control: a value below 100 represents a decrease of the maximum value of the loss factor, or a decrease of the hysteresis of the rubber composition.

2-Synthesis of the 1.3-dipolar compound 3-(di-ethoxyphosphoryloxy)-2.4.6-trimethylbenzonitrile oxide

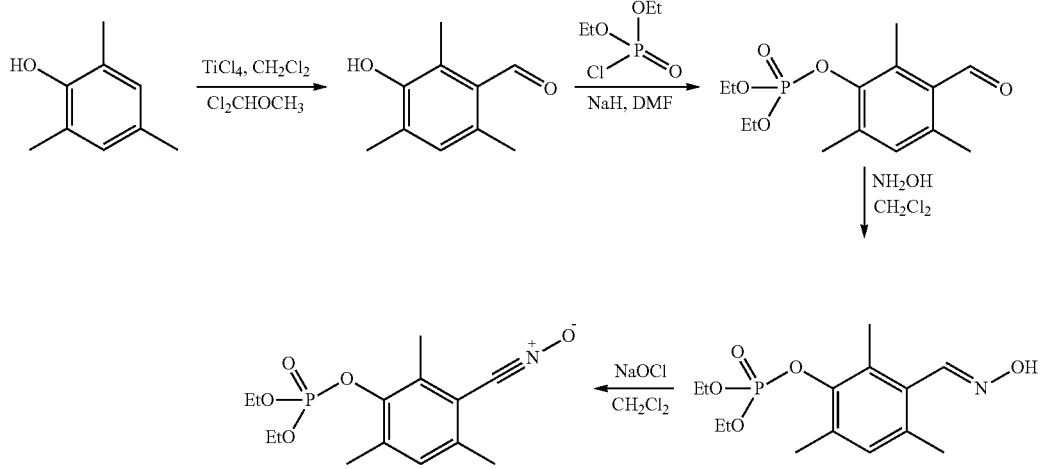

The preparation of the compound 3-hydroxy-2,4,6-trimethylbenzaldehyde is described in the article Yabukov, A. P.; Tsyganov, D. V.; Belen'kii, L. I.; Krayushkin, M. M.; *Bulletin of the Academy of Sciences of the USSR, Division of Chemical Science (English translation)*; Vol. 40; No. 7.2; (1991); p. 1427-1432; *Izvestiya Akademii Nauk SSSR, Seriya Khimicheskaya*; No. 7 (1991); p 1609-1615.

2-1—Synthesis of diethyl (3-formyl-2,4,6-trimethylphenyl)phosphate

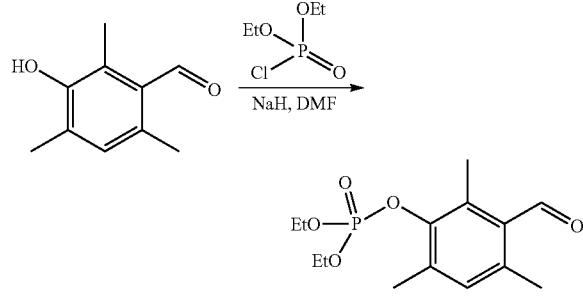

Sodium hydride (60 wt % of NaH in mineral oil, 1.4 g, 0.0348 mol) is added in three portions (under argon) to a solution of 3-hydroxy-2,4,6-trimethylbenzaldehyde (5.206 g, 0.032 mol) in dimethylformamide (DMF) (100 mL). The reaction mixture is heated at 40° C. for 1 hour (the sodium hydride must react completely). Then a solution of diethylchlorophosphate (5.744 g, 0.033 mol) in DMF (10 mL) is added dropwise to the reaction mixture. The latter is heated to 115-120° C. After 8 hours, the reaction mixture is cooled to 20° C. and poured into 1 L of ice water. The aqueous phase is extracted with $CH_2Cl_2$ (3×150 mL). The organic phase is washed with water, then with a saturated NaCl solution, dried over $MgSO_4$ and concentrated under reduced pressure. A brown oil (10.941 g, 0.036 mol, yield 100%) is obtained. The molar purity is above 70% ($^1H$ NMR). NMR analysis is performed using acetone-d6 (calibration on the acetone signal at 1.98 ppm in $^1H$ and 29.8 ppm in $^{13}C$) as solvent. An NMR signal of $^{31}P$ is observed at −6 ppm.

This product is used in the next step without purification.

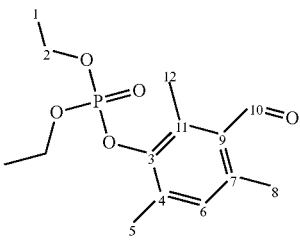

| Atom | δ $^1H$ (ppm) | δ $^{13}C$ (ppm) |
|---|---|---|
| 1 | 1.25 | 16.4 |
| 2 | 4.13 | 65.1 |
| 3 | — | 147.6 |
| 4 | — | ? |
| 5 | 2.49 | 13.3 |
| 6 | 6.97 | 132.5 |
| 7 | — | ? |
| 8 | 2.44 | 19.6 |
| 9 | — | 132.7 |
| 10 | 10.46 | 193.7 |
| 11 | — | ? |
| 12 | 2.31 | 17.9 |

2-2—Synthesis of diethyl 3-((hydroxyimino)methyl)-2,4,6-trimethylphenylphosphate

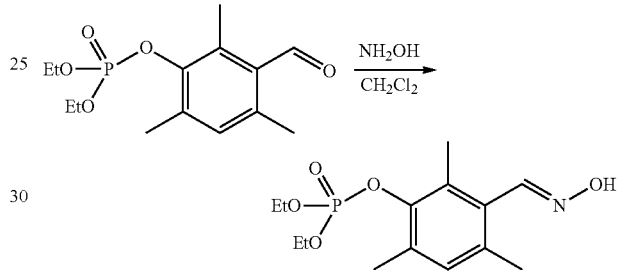

A solution of hydroxylamine (5.10 g 0.155 mol=10.20 g 50% in water, Aldrich) is added to a mixture of diethyl 3-formyl-2,4,6-trimethylphenylphosphate (15.48 g, 0.052 mol) in EtOH (100 mL). The reaction mixture is stirred for 24 hours at 23° C. Cold water (1.5 L) is then added to the reaction mixture. The precipitate obtained is filtered and washed on the filter with water (1 L). The product obtained is dried at atmospheric pressure and room temperature. A white solid (14.36 g, 0.045 mol, yield 88%) is obtained. The molar purity is above 90% ($^1H$ NMR). An NMR signal of $^{31}P$ is observed at −6 ppm.

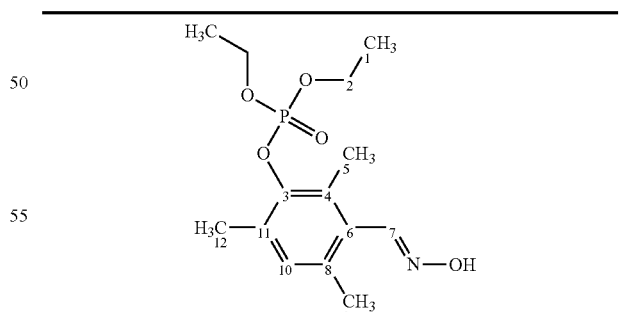

| No | δ $^1H$ (ppm) | δ $^{13}C$ (ppm) |
|---|---|---|
| 1 | 1.19 | 16.2 |
| 2 | 4.07 | 64.6 |
| 3 | / | 145.9 |
| 4, 6, 8, 11 | / | 129.5 + 130.8 + 133.1 + 133.4 |
| 5 | 2.20 | 14.5 |
| 7 | 8.21 | 147.7 |

| | | |
|---|---|---|
| 9 | 2.20 | 20.4 |
| 10 | 6.92 | 130.8 |
| 12 | 2.20 | 17.1 |
| OH | 11.20 | / |

2-3—Synthesis of 3-(diethoxyphosphoryloxy)-2,4,6-trimethylbenzonitrile oxide

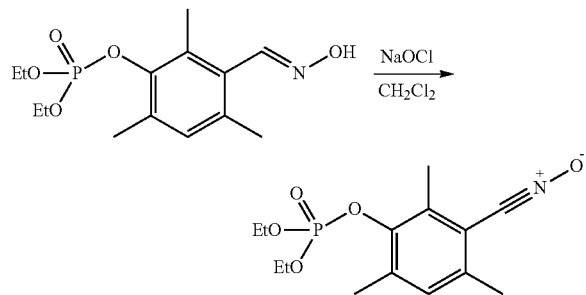

Javel water (solution of NaOCl, 160 mL/4.3-4.5% $Cl_2$, Aldrich) is added dropwise, with vigorous stirring, to a suspension of 3-(diethylphosphate)-2,4,6-trimethylbenzaldehyde (32.30 g, 0.102 mol) in $CH_2Cl_2$ (700 mL) cooled to −5° C. The reaction mixture is stirred for 35 minutes at −5° C. Then the organic phase is washed with water, dried over $Na_2SO_4$ and concentrated under reduced pressure, to give an oil that crystallizes at −18° C. after 2 h. After recrystallization from petroleum ether (200-250 ml, 40/60 fractions), a pale-yellow solid (26.09 g, 0.083 mol, yield 81%) with melting point of 55° C. is obtained. The molar purity is above 99% ($^1$H NMR). An NMR signal of $^{31}$P is observed at −5.9 ppm.

| No | δ $^1$H (ppm) | δ $^{13}$C (ppm) |
|---|---|---|
| 1 | 1.20 | 15.6 |
| 2 | 4.09 | 64.2 |
| 3 | / | 145.3 |
| 4/8/11 | / | 132.9 + 133.5 + 138.1 |
| 5 | 2.31 | 15.3 |
| 6 | / | 112.4 |
| 7 | / | / |
| 9 | 2.29 | 19.3 |
| 10 | 7.09 | 130.2 |
| 12 | 2.23 | 16.7 |

3-Grafting of the 1,3-dipolar compound 3-(2-ethoxy-2-oxoethoxy)-2,4,6-trimethylbenzonitrile oxide on a polymer by [2+3] cycloaddition The 1,3-dipolar compound obtained by the procedure described above is used. Evidence of the grafting reaction is provided by $^1$H NMR analysis performed on samples dissolved in carbon disulphide, in the presence of deuterated cyclohexane $C_6D_6$ for the lock signal.

Grafting on an SBR:

The polymer is an SBR that contains 25% of styrene units and 58% of 1,2 units of the butadiene moiety.

The 1,3-dipolar compound (0.71 g, 2.26 mmol), with NMR purity of 99 mol %, is incorporated in 50 g of SBR on an open mill (external mixer at 30° C.). The mixture is homogenized in 15 portfolio passes. This mixing step is followed by thermal treatment at 120° C. for 10 minutes in a press at 10 bar pressure. Analysis by $^1$H NMR made it possible to determine a molar level of addition of the 1,3-dipolar compound of 0.30 mol % and a molar yield of addition of 98%.

Grafting on an IR:

The polymer is a "Nipol® IR2200" IR that contains 97% of 1,4-cis bond. The 1,3-dipolar compound (0.68 g, 2.21 mmol), with NMR purity of 99 mol %, is incorporated in 50 g of IR on an open mill (external mixer at 30° C.). The mixture is homogenized in 15 portfolio passes. This mixing step is followed by thermal treatment at 120° C. for 10 minutes in a press at 10 bar pressure. Analysis by $^1$H NMR made it possible to determine a molar level of addition of the 1,3-dipolar compound of 0.27 mol % and a molar yield of addition of 90%.

4-Preparation of the Rubber Compositions

The 1,3-dipolar compound whose synthesis is described above is used.

The formulations (in phr) of compositions A and B described in Table I. Compositions A and B based on SBR and silica differ in that composition B contains the 1,3-dipolar compound. Composition B is according to embodiments of the invention, composition A is not according to the invention and is the control composition of composition B.

These compositions are manufactured as follows: an internal mixer (final filling level: about 70 vol %), with initial vessel temperature of about 110° C., is charged with the elastomer, if applicable the 1,3-dipolar compound, which is kneaded alone with the elastomer for 1 minute at 120° C., then the silica, the coupling agent, as well as the various other ingredients apart from the vulcanization system. Then thermomechanical working (non-productive step) is carried out in one step, lasting about 5 to 6 minutes, until a maximum "drop" temperature of 160° C. is reached. The mixture thus obtained is recovered, it is cooled and then sulphur and an accelerator of the sulphenamide type are incorporated on a mixer (homo-finisher) at 25° C., mixing the whole (productive step) for a suitable time (for example between 5 and 12 min).

The compositions thus obtained are then calendered, either in the form of plates (with a thickness ranging from 2 to 3 mm) or thin sheets of rubber, for measuring their physical or mechanical properties, or in the form of profiled elements that are directly usable, after cutting and/or assembly to the desired dimensions, for example as semifinished products for tires, in particular for tire treads. Crosslinking is carried out at 150° C.

5-Characterization Tests—Results

The results are presented in Table (II) below.

Compared to the control composition A, composition B according to embodiments of the invention has both a higher reinforcement index MSA300/MSA100, and much lower tand max and ΔG*, without a decrease in the modulus G* being observed. The improvement in the reinforcement index of composition B reflects an improvement in the cohesion of composition B compared to composition A. Composition B has a better compromise of properties, namely rigidity, cohesion and hysteresis. This result is surprising, as generally a large decrease in hysteresis is accompanied by a decrease in rigidity.

TABLE I

| | Composition | |
|---|---|---|
| | A control | B according to embodiments of the invention |
| IR (1) | 100 | 100 |
| 1,3-Dipolar compound (2) | — | 1.38 |
| Carbon black N234 | 3 | 3 |
| Silica (3) | 55 | 55 |
| Silane (4) | 5.5 | 5.5 |
| Antioxidant (5) | 2.5 | 2.5 |
| Paraffin | 1 | 1 |
| ZnO | 2.5 | 2.5 |
| Stearic acid | 2.5 | 2.5 |
| Sulphenamide (6) | 1.8 | 1.8 |
| Sulphur | 1.5 | 1.5 |

(1) "Nipol ® IR2200"
(2) 1,3-Dipolar compound, synthesis of which is described above in section II.2
(3) "Zeosil 1165 MP" silica from the company Rhodia (type HDS)
(4) TESPT ("Si69" from the company Degussa)
(5) Mixture of N-(1,3-dimethylbutyl)-N'-phenyl-p-phenylenediamine, from the company Flexsys and tetramethylquinone in a 60/40 weight ratio
(6) N-cyclohexyl-2-benzothiazole-sulphenamide ("Santocure CBS" from the company Flexsys)

TABLE (II)

| | Composition | |
|---|---|---|
| Properties in the cured state | A | B |
| MSA100 | 100 | 95 |
| MSA300 | 100 | 105 |
| MSA300/MSA100 | 100 | 110 |
| G* | 100 | 101 |
| tand max | 100 | 76 |
| ΔG* | 100 | 47 |

The invention claimed is:

1. A 1,3-dipolar compound comprising a phosphorus-containing group of formula (I) and a dipole containing a nitrogen atom,

—OP(O)(OR')(OR")      (I)

R' and R", which may be identical or different, representing a hydrogen or a carbon-containing group, and wherein the dipole containing a nitrogen atom is a dipole having the formula —C≡N→O.

2. The compound according to claim 1, in which the carbon-containing group is selected from the group consisting of an alkyl group, an aryl group, and an alkaryl group.

3. The compound according to claim 1, in which at least one of R' and R" is different from hydrogen.

4. The compound according to claim 2, in which R' and R" represent independently an alkyl group.

5. The compound according to claim 4, in which R' and R" represent independently methyl or ethyl.

6. A 1,3-dipolar compound comprising a unit of formula (II):

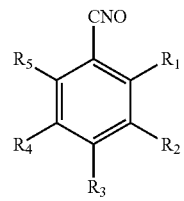

in which:
four of the five symbols $R_1$ to $R_5$, which may be identical or different, are each an atom or a group of atoms, and the fifth symbol denotes a direct or indirect attachment to a phosphorus-containing group, and $R_1$ and $R_5$ are both different from H, and wherein the phosphorus-containing group is represented by formula (I)

—OP(O)(OR')(OR")      (I)

R' and R", which may be identical or different, representing a hydrogen or a carbon-containing group.

7. The compound according to claim 6, in which $R_2$ or $R_4$ represents a direct attachment to the phosphorus-containing group.

8. The compound according to claim 6, in which $R_1$, $R_3$ and $R_5$ are identical.

9. The compound according to claim 6, in which $R_1$, $R_3$ and $R_5$ are each an alkyl group with 1 to 6 carbon atoms.

10. The compound according to claim 9, in which $R_1$, $R_3$ and $R_5$ are each a methyl or an ethyl.

11. A 1,3-dipolar compound comprising a unit of formula (III)

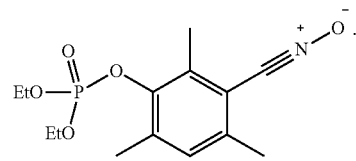

12. A method for modifying, by a grafting reaction, an unsaturated polymer that has at least one unsaturation, said method comprising reacting the 1,3-dipolar compound defined according to claim 1 on at least one unsaturation of the unsaturated polymer.

13. The method according to claim 12, in which the unsaturated polymer is a diene polymer.

14. A rubber composition comprising:
a diene elastomer,
a reinforcing filler, the reinforcing filler comprising an inorganic reinforcing filler, and the 1,3-dipolar compound defined according to claim 1.

15. The rubber composition according to claim 14, in which the inorganic reinforcing filler is a silica.

16. The rubber composition according to claim 14, in which the amount of 1,3-dipolar compound is between 1 and 5 molar equivalents of phosphorus-containing group per 100 moles of monomer units constituting the diene elastomer.

17. The rubber composition according to claim 14, said composition further comprising a silane coupling agent for binding the inorganic reinforcing filler to the diene elastomer.

18. The rubber composition according to claim 14, in which the 1,3-dipolar compound is pre-grafted on the diene elastomer by a method comprising reacting the 1,3-dipolar compound on at least one unsaturation of the diene elastomer.

19. The rubber composition according to claim 14, said composition further comprising a crosslinking system.

20. A tire comprising the rubber composition according to claim 14.

21. The tire according to claim 20, wherein the rubber composition is in a tread of the tire.

* * * * *